United States Patent
Baus et al.

(10) Patent No.: US 8,173,716 B2
(45) Date of Patent: May 8, 2012

(54) OPEN-CELL FOAM MODIFIED WITH HYDROPHOBINES

(75) Inventors: Ulf Baus, Dossenheim (DE); Thorsten Montag, Dudenhofen (DE); Claus Bollschweiler, Heidelberg (DE); Thomas Subkowski, Ladenburg (DE); Marvin Karos, Schwetzingen (DE); Armin Alteheld, Bad Kreuznach (DE); Hans-Jürgen Quadbeck-Seeger, Bad Dürkheim (DE); Bernhard Vath, Mannheim (DE)

(73) Assignee: BASF SE (DE)

( * ) Notice: Subject to any disclaimer, the term of this patent is extended or adjusted under 35 U.S.C. 154(b) by 422 days.

(21) Appl. No.: 12/529,988

(22) PCT Filed: Mar. 4, 2008

(86) PCT No.: PCT/EP2008/052619
§ 371 (c)(1),
(2), (4) Date: Sep. 4, 2009

(87) PCT Pub. No.: WO2008/107439
PCT Pub. Date: Sep. 12, 2008

(65) Prior Publication Data
US 2010/0044308 A1 Feb. 25, 2010

(30) Foreign Application Priority Data
Mar. 6, 2007 (EP) .................... 07103547

(51) Int. Cl.
*C08J 9/00* (2006.01)
*C08J 9/35* (2006.01)
*C08J 3/02* (2006.01)
*C08F 220/00* (2006.01)

(52) U.S. Cl. ............ 521/102; 521/55; 521/167; 521/61; 524/831

(58) Field of Classification Search .................. 521/102, 521/61, 55; 524/831
See application file for complete search history.

(56) References Cited

U.S. PATENT DOCUMENTS

| | | | |
|---|---|---|---|
| 4,334,971 A * | 6/1982 | Mahnke et al. ............... | 521/136 |
| 2006/0040349 A1 | 2/2006 | Sweigard et al. | |
| 2006/0194893 A1 | 8/2006 | Prybutok | |
| 2007/0213417 A1* | 9/2007 | Stork et al. ...................... | 521/61 |
| 2008/0300329 A1 | 12/2008 | Fechtenkotter et al. | |
| 2008/0319168 A1 | 12/2008 | Subkowski et al. | |
| 2009/0041922 A1* | 2/2009 | Kuhnle et al. ................. | 426/654 |
| 2009/0101167 A1 | 4/2009 | Boeckh et al. | |
| 2009/0104663 A1 | 4/2009 | Subkowski et al. | |
| 2009/0131281 A1 | 5/2009 | Guzmann et al. | |
| 2009/0136996 A1 | 5/2009 | Subkowski et al. | |
| 2009/0162659 A1 | 6/2009 | Exner et al. | |
| 2009/0241413 A1 | 10/2009 | Subkowski et al. | |

(Continued)

FOREIGN PATENT DOCUMENTS
CA 2602155 A1 10/2006
(Continued)

*Primary Examiner* — Randy Gulakowski
*Assistant Examiner* — Kara Negrelli
(74) *Attorney, Agent, or Firm* — Connolly Bove Lodge & Hutz LLP

(57) ABSTRACT

Open-cell foam based on a melamine-formaldehyde condensation product, a polyurethane or a polyimide, which has been modified with hydrophobins, a method of producing such foams, and the use thereof for absorbing organic liquids, as leakage and bleeding protection for liquid stores, for liquid-liquid separation and as matrix for carrying out chemical and/or biological processes.

20 Claims, 2 Drawing Sheets

U.S. PATENT DOCUMENTS

Figure 1:
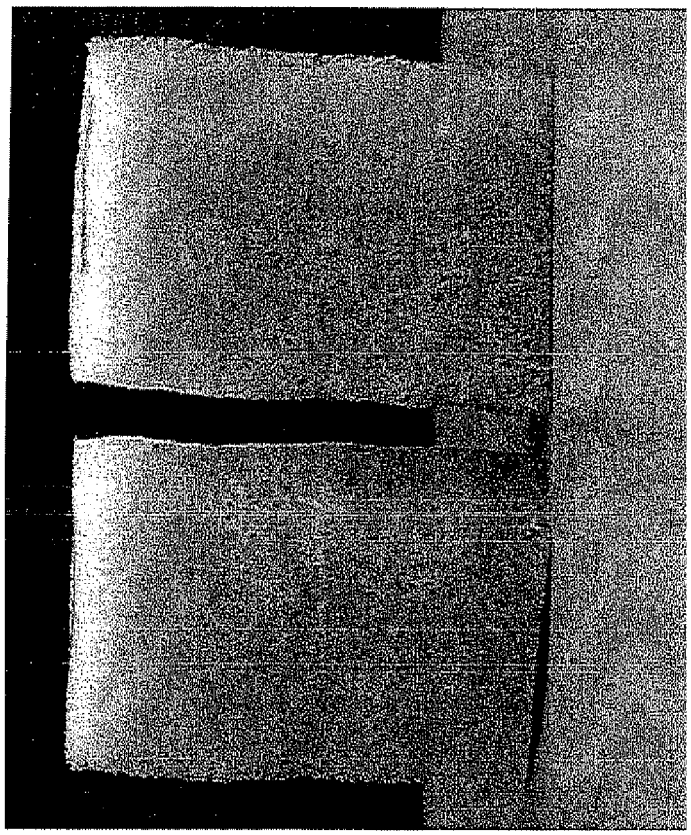

2009/0282729 A1 11/2009 Guzmann et al.

FOREIGN PATENT DOCUMENTS

| | | |
|---|---|---|
| DE | 10011388 A1 | 11/2000 |
| EP | 0017672 A1 | 12/1979 |
| EP | 0037470 A1 | 10/1981 |
| EP | 0633283 A1 | 1/1995 |
| EP | 1252516 B1 | 4/2004 |
| WO | WO-9641882 A1 | 12/1996 |
| WO | WO-0194436 A2 | 12/2001 |
| WO | WO-2005068087 A2 | 7/2005 |
| WO | WO-2005103107 A1 | 11/2005 |
| WO | WO-2006008054 A1 | 1/2006 |
| WO | WO-2006082251 A2 | 8/2006 |
| WO | WO-2006082253 A2 | 8/2006 |
| WO | WO-2006103215 A1 | 10/2006 |
| WO | WO-2006103251 A1 | 10/2006 |
| WO | WO-2006128877 A1 | 12/2006 |
| WO | WO-2006131555 A1 | 12/2006 |
| WO | WO-2006131564 A2 | 12/2006 |
| WO | WO 2007/006765 * | 1/2007 |
| WO | WO-2007006765 A1 | 1/2007 |
| WO | WO-2007014897 A1 | 2/2007 |
| WO | WO-2007082784 A1 | 7/2007 |

* cited by examiner

OPEN-CELL FOAM MODIFIED WITH HYDROPHOBINES

CROSS-REFERENCE TO RELATED APPLICATIONS

This application is a national stage application (under 35 U,S.C. §371) of PCT/EP2008/052619, filed Mar. 4, 2008, which claims benefit of European application 07103547.1, filed Mar. 6, 2007.

BACKGROUND OF THE INVENTION

The present invention relates to an open-cell foam based on a melamine-formaldehyde condensation product, a polyurethane or a polyimide, which has been modified with hydrophobins, to a method of producing such foams, and to the use thereof for absorbing organic liquids, as leakage and bleeding protection for liquid stores and for liquid-liquid separation.

Open-cell, elastic foams based on melamine-formaldehyde resins, polyurethanes or polyimides are known in principle. By way of example, reference may be made to "Foamed Plastics", in particular section "4.6 Foams from Melamine-Formaldehyde (MF) Resins" and "4.9 Polyimide (PI) Foams" and "Polyurethanes—7.1 Flexible Foams", in each case in Ullmann's Encyclopedia of Industrial Chemistry, 7th Edition 2006, Electronic Release, Wiley-VCH, Weinheim, New York 2006. Production methods for such foams based on melamine-formaldehyde resins are disclosed, for example, in EP-A 17 672, EP-A 37 470 or WO 01/94436.

Open-cell, elastic foams based on melamine-formaldehyde resins are notable for a comparatively low density, good flame-resistance, and high high-temperature and low-temperature stability. They are suitable in particular for the thermal insulation of buildings, vehicles, pipelines or tanks, for noise insulation, and as insulating and shock-absorbing packaging material.

Untreated melamine-formaldehyde foams absorb both hydrophilic and hydrophobic liquids very rapidly. The absorption of water can have an adverse effect on the properties, for example an increase in the density or a deterioration in the thermal insulation effect.

DE-A 100 11 388 discloses an open-cell melamine resin foam whose cell structure has been coated with a fluoroalkyl ester. This reduces the ability of the melamine resin foam to absorb both water and oil.

It is known from EP-A 633 283 to reduce the water absorption of melamine-formaldehyde foams by coating the foam structure with a hydrophobic material, in particular with an aqueous emulsion of a silicone resin. In the examples, a foam with an apparent density of 11 kg/m$^3$ is used which, in an additional process step, is coated with a hydrophobic agent and, after the treatment, has apparent densities between 72 kg/m$^3$ and 120 kg/m$^3$. The higher density is extremely disadvantageous for weight-sensitive applications, such as, for example, applications in vehicle construction, and in particular applications in aeroplane construction and in space travel.

Hydrophobins are small proteins of about 100 to 150 amino acids which occur in filamentous fungi, for example *Schizophyllum commune*. They generally have 8 cysteine units. Hydrophobins can be isolated from natural sources, but can also be obtained by means of genetic engineering methods, as disclosed, for example, by WO 2006/082251 or WO 2006/131564.

The prior art has proposed the use of hydrophobins for various applications.

WO 96/41882 proposes the use of hydrophobins as emulsifiers, thickeners, surface-active substances, for the hydrophilization of hydrophobic surfaces, for improving the water resistance of hydrophilic substrates, for producing oil-in-water emulsions or water-in-oil emulsions. Furthermore, pharmaceutical applications, such as the production of ointments or creams, and also cosmetic applications, such as skin protection or the production of hair shampoos or hair rinses, are proposed. EP 1 252 516 discloses the coating of various substrates with a solution comprising hydrophobins at a temperature of from 30 to 80° C. Furthermore, the use as demulsifier (WO 2006/103251), as vaporization retarder (WO 2006/128877) or soiling inhibitor (WO 2006/103215), for example, has been proposed.

The use of hydrophobins for modifying open-cell foams based on melamine-formaldehyde condensation products, polyurethanes or polyimides is hitherto still not known.

BRIEF SUMMARY OF THE INVENTION

It was an object of the invention to provide a modified, open-cell foam based on melamine-formaldehyde condensation products, polyurethanes or polyimides with a new type of property profile.

Accordingly, an open-cell foam based on a melamine-formaldehyde condensation product has been found which has been modified with at least one hydrophobin.

Furthermore, a method of producing such a foam has been found, in which an unmodified, open-cell foam based on a melamine-formaldehyde condensation product, a polyurethane or a polyimide is treated with an aqueous solution of a hydrophobin.

A further production method has been found in which the production of the open-cell foam is undertaken in the presence of at least one hydrophobin.

Finally, the use of such modified foams has been for various purposes, in particular for noise and thermal insulation, and also for the separation of organic phases from emulsions or mixtures with water.

A BRIEF DESCRIPTION OF THE DRAWINGS

FIG. 1 illustrates cross sections of sample bodies of modified foam.

Figure 2:
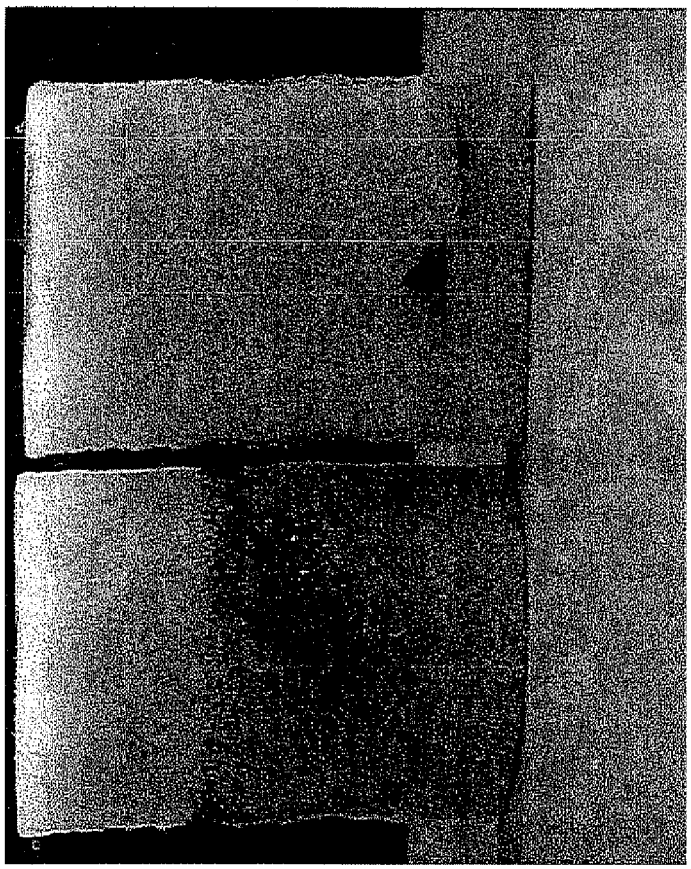

FIG. 2: illustrates cross sections of sample bodies of unmodified foam for comparison.

Figure 5:
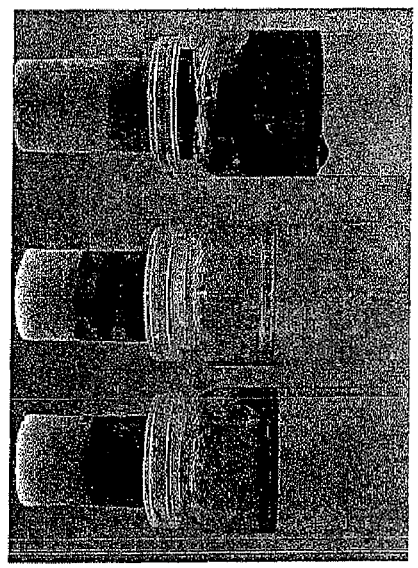
Figure 4:
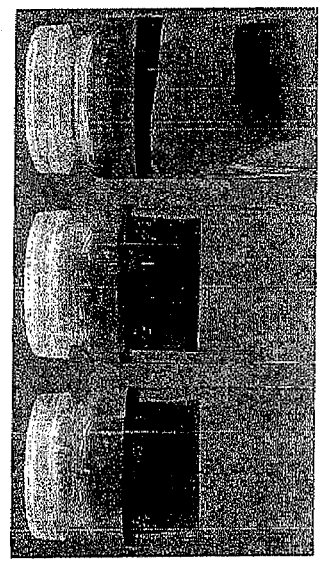
Figure 3:
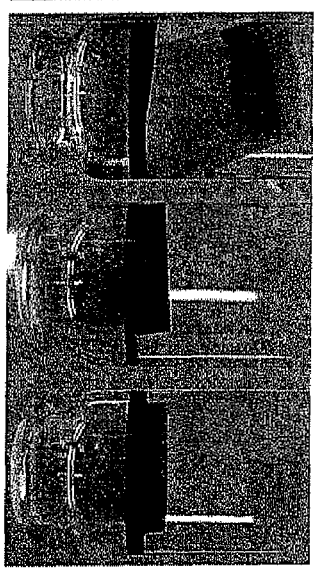

FIGS. 3 to 5 illustrate the course of the experiment.
FIG. 3 illustrates the start of the experiment.
FIG. 4 illustrates during the experiment.
FIG. 5 illustrates the foam after the end of the experiment.

DETAILED DESCRIPTION OF THE INVENTION

Details of the invention are as follows:

For the purposes of the present invention, the term "hydrophobins" should be understood below as meaning polypeptides of the general structural formula (I)

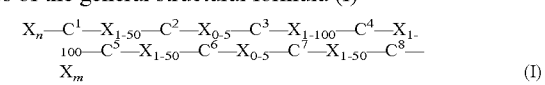

(I)

where X can be any of the 20 naturally occurring amino acids (Phe, Leu, Ser, Tyr, Cys, Trp, Pro, His, Gln, Arg, Ile Met, Thr, Asn, Lys, Val, Ala, Asp, Glu, Gly). Here, the radicals X can in each case be identical or different. Here, the indices alongside X in each case represent the number of amino acids in the respective part-sequence X, C is cysteine, alanine, serine, glycine, methionine or threonine, where at least four of the radicals called C are cysteine, and the indices n and m, independently of one another, are natural numbers between 0 and 500, preferably between 15 and 300.

Furthermore, the polypeptides according to the formula (I) are characterized by the property that, at room temperature, after coating a glass surface, they bring about an increase in the contact angle of a water drop of at least 20°, preferably at least 25° and particularly preferably 30°, in each case compared with the contact angle of an equally sized water drop with the uncoated glass surface.

The amino acids named $C^1$ to $C^8$ are preferably cysteines; however, they can also be replaced by other amino acids of similar space filling, preferably by alanine, serine, threonine, methionine or glycine. However, at least four, preferably at least 5, particularly preferably at least 6 and in particular at least 7, of the positions $C^1$ to $C^8$ should consist of cysteines. Cysteines in the proteins according to the invention can either be present in reduced form or form disulfide bridges with one another. Particular preference is given to the intramolecular formation of C—C bridges, in particular those with at least one, preferably 2, particularly preferably 3 and very particularly preferably 4, intramolecular disulfide bridges. In the case of the above-described exchange of cysteines for amino acids with similar space filling, the C positions exchanged in pairs are advantageously those which can form intramolecular disulfide bridges with one another.

If, in the positions referred to as X, cysteines, serines, alanines, glycines, methionines or threonines are also used, the numbering of the individual C positions in the general formulae can change accordingly.

Preference is given to using hydrophobins of the general formula (II)

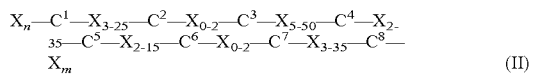
$$X_n-C^1-X_{3\text{-}25}-C^2-X_{0\text{-}2}-C^3-X_{5\text{-}50}-C^4-X_{2\text{-}35}-C^5-X_{2\text{-}15}-C^6-X_{0\text{-}2}-C^7-X_{3\text{-}35}-C^8-X_m \quad \text{(II)}$$

for carrying out the present invention, where X, C and the indices alongside X and C have the above meaning, the indices n and m are numbers between 0 and 350, preferably 15 to 300, the proteins are further notable for the abovementioned contact angle change, and furthermore, at least 6 of the radicals called C are cysteine. Particularly preferably, all of the radicals C are cysteine.

Particular preference is given to using hydrophobins of the general formula (III)

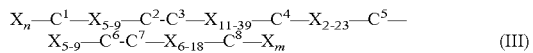
$$X_n-C^1-X_{5\text{-}9}-C^2\text{-}C^3-X_{11\text{-}39}-C^4-X_{2\text{-}23}-C^5-X_{5\text{-}9}-C^6\text{-}C^7-X_{6\text{-}18}-C^8-X_m \quad \text{(III)}$$

where X, C and the indices alongside X have the above meaning, the indices n and m are numbers between 0 and 200, the proteins are further notable for the abovementioned contact angle change, and at least 6 of the radicals denoted C are cysteine. Particularly preferably, all of the radicals C are cysteine.

The radicals $X_n$ and $X_m$ may be peptide sequences which are naturally also joined to a hydrophobin. However, one or both radicals may also be peptide sequences which are naturally not joined to a hydrophobin. These are also to be understood as meaning those radicals $X_n$ and/or $X_m$ in which a peptide sequence occurring naturally in a hydrophobin is extended by a peptide sequence not occurring naturally in a hydrophobin.

If $X_n$ and/or $X_m$ are peptide sequences not naturally joined to hydrophobins, such sequences are generally at least 20, preferably at least 35, amino acids in length. These may, for example, be sequences of 20 to 500, preferably 30 to 400 and particularly preferably 35 to 100, amino acids. Such a radical not joined naturally to a hydrophobin will also be referred to below as fusion partner. This is intended to express that the proteins can consist of at least one hydrophobin part and one fusion partner part which do not occur together in this form in nature. Fusion hydrophobins of fusion partner and hydrophobin part have been disclosed, for example, in WO 2006/082251, WO 2006/082253 and WO 2006/131564.

The fusion partner part can be selected from a large number of proteins. It is possible for only a single fusion partner to be joined to the hydrophobin part, or also for a plurality of fusion partners to be joined to a hydrophobin part, for example at the amino terminus ($X_n$) and at the carboxy terminus ($X_m$) of the hydrophobin part. However, it is also possible, for example, for two fusion partners to be joined to one position ($X_n$ or $X_m$) of the protein according to the invention.

Particularly suitable fusion partners are proteins which occur naturally in microorganisms, in particular in *E. coli* or *Bacillus subtilis*. Examples of such fusion partners are the sequences yaad (SEQ ID NO: 16 in WO 2006/082251), yaae (SEQ ID NO:18 in WO 2006/082251), ubiquitin and thioredoxin. Also highly suitable are fragments or derivatives of these specified sequences which comprise only part, for example 70 to 99%, preferably 5 to 50%, and particularly preferably 10 to 40%, of the specified sequences, or in which individual amino acids, or nucleotides are changed compared with the specified sequence, where the percentages refer in each case to the number of amino acids.

In a further preferred embodiment, the fusion hydrophobin has, besides the specified fusion partner as one of the groups $X_n$ or $X_m$ or as terminal constituent of such a group, also a so-called affinity domain (affinity tag/affinity tail). These are, in a manner known in principle, anchor groups which can interact with certain complementary groups and can serve for easier work-up and purification of the proteins. Examples of such affinity domains comprise $(\text{His})_k$, $(\text{Arg})_k$, $(\text{Asp})_k$, $(\text{Phe})_k$ or $(\text{Cys})_k$ groups, where k is in general a natural number from 1 to 10. Preferably, it may be a $(\text{His})_k$ group, where k is 4 to 6. Here, the group $X_n$ and/or $X_m$ can consist exclusively of one such affinity domain, or a radical $X_n$ or $X_m$ joined naturally or non-naturally to a hydrophobin is extended by a terminally arranged affinity domain.

The hydrophobins used according to the invention can also be modified further in their polypeptide sequence, for example by glycosylation, acetylation or else by chemical crosslinking, for example with glutardialdehyde.

One property of the hydrophobins used according to the invention or derivatives thereof is the change in surface properties when the surfaces are coated with the proteins. The change in the surface properties can be determined experimentally, for example, by measuring the contact angle of a drop of water before and after coating the surface with the protein and determining the difference between the two measurements.

The procedure for measuring contact angles is known in principle to the person skilled in the art. The measurements refer to room temperature and water drops of 5 μl and the use of small glass plates as substrate. The exact experimental conditions for a method, suitable by way of example, for measuring the contact angle are illustrated in the experimental section. Under the conditions specified therein, the fusion proteins used according to the invention have the property of enlarging the contact angle by at least 20°, preferably at least 25°, particularly preferably at least 30°, in each case compared with the contact angle of an equally sized water drop with the uncoated glass surface.

Particularly preferred hydrophobins for carrying out the present invention are the hydrophobins of the type dewA, rodA, hypA, hypB, sc3, basf1, basf2. These hydrophobins including their sequences are disclosed, for example, in WO 2006/82251. Unless stated otherwise, the sequences stated below refer to sequences disclosed in WO 2006/82251. An overview table with the SEQ ID numbers can be found in WO 2006/82251 on page 20.

Of particular suitability according to the invention are the fusion proteins yaad-Xa-dewA-his (SEQ ID NO: 20), yaad-Xa-rodA-his (SEQ ID NO: 22) or yaad-Xa-basf1-his (SEQ ID NO: 24) with the polypeptide sequences stated in brackets, and the nucleic acid sequences coding therefor, in particular the sequences according to SEQ ID NO: 19, 21, 23. Particularly preferably, yaad-Xa-dewA-his (SEQ ID NO: 20) can be used. Proteins which are produced starting from the polypeptide sequences shown in SEQ ID NO. 20, 22 or 24 as a result of exchange, insertion or deletion of at least one, up to 10, preferably 5, particularly preferably 5%, of all amino acids, and which still have the biological property of the starting proteins to at least 50%, are also particularly preferred embodiments. Biological property of the proteins is understood here as meaning the already described change in the contact angle by at least 20°.

Derivatives particularly suitable for carrying out the present invention are derivatives derived from yaad-Xa-dewA-his (SEQ ID NO: 20), yaad-Xa-rodA-his (SEQ ID NO: 22) or yaad-Xa-basf1-his (SEQ ID NO: 24) by shortening the yaad fusion partner. Instead of the complete yaad fusion partner (SEQ ID NO: 16) with 294 amino acids, a shortened yaad radical can advantageously be used. The shortened radical should, however, comprise at least 20, preferably at least 35, amino acids. For example, a shortened radical having 20 to 293, preferably 25 to 250, particularly preferably 35 to 150 and, for example, 35 to 100, amino acids can be used. One example of such a protein is yaad40-Xa-dewA-his (SEQ ID NO: 26 in PCT/EP2006/064720), which has a yaad radical shortened to 40 amino acids.

A cleavage site between the hydrophobin and the fusion partner or the fusion partners can be utilized for cleaving off the fusion partner and releasing the pure hydrophobin in underivatized form (for example by BrCN cleavage on methionine, factor Xa, enterokinase, thrombin, TEV cleavage etc.).

The hydrophobins used according to the invention for modifying open-cell foams can be produced chemically by known methods of peptide synthesis, such as, for example, by solid-phase synthesis according to Merrifield.

Naturally occurring hydrophobins can be isolated from natural sources using suitable methods. By way of example, reference may be made to Wösten et al., Eur. J Cell Bio. 63, 122-129 (1994) or WO 96/41882.

A genetic engineering production method for hydrophobins without fusion partners from *Talaromyces thermophilus* is described by US 2006/0040349.

The production of fusion proteins can preferably take place by genetic engineering methods in which a nucleic acid sequence coding for the fusion partner and a nucleic acid sequence coding for the hydrophobin part, in particular DNA sequence, are combined such that the desired protein is produced in a host organism through gene expression of the combined nucleic acid sequence. Such a production method, for example, is disclosed by WO 2006/082251 or WO 2006/082253. The fusion partners make the production of the hydrophobins considerably easier. Fusion hydrophobins are produced in genetic engineering methods with significantly better yields than hydrophobins without fusion partners.

The fusion hydrophobins produced by the genetic engineering method from the host organisms can be worked up in a manner known in principle and be purified by means of known chromatographic methods.

In a preferred embodiment, the simplified work-up and purification method disclosed in WO 2006/082253, pages 11/12 can be used. For this, the fermented cells are firstly separated off from the fermentation broth, digested and the cell fragments are separated from the inclusion bodies. The latter can be carried out advantageously by centrifugation. Finally, the inclusion bodies can be digested in a manner known in principle, for example by acids, bases and/or detergents, in order to release the fusion hydrophobins. The inclusion bodies with the fusion hydrophobins used according to the invention can generally be completely dissolved even using 0.1 m NaOH within about 1 h.

The resulting solutions can—if appropriate after establishing the desired pH—be used without further purification for carrying out this invention. The fusion hydrophobins can, however, also be isolated from the solutions as solid. Preferably, the isolation can take place by means of spray granulation or spray drying, as described in WO 2006/082253, page 12. The products obtained after the simplified work-up and purification method comprise, besides remains of cell fragments, generally about 80 to 90% by weight of proteins. Depending on the fusion construct and fermentation conditions, the amount of fusion hydrophobins is generally 30 to 80% by weight with regard to the amount of all proteins.

The isolated products comprising fusion hydrophobins can be stored as solids and be dissolved for use in the media desired in each case.

The fusion hydrophobins can be used as such or also after cleavage and removal of the fusion partner as "pure" hydrophobins for carrying out this invention. A cleavage is undertaken advantageously following isolation of the inclusion bodies and their dissolution.

According to the invention, the hydrophobins are used for modifying open-cell foams.

In a preferred embodiment of the invention, these are open-cell foams based on melamine-formaldehyde resins.

In a first embodiment of the invention, the modified foams can be obtained by using unmodified, open-cell foams and treating them with hydrophobins.

Production methods for unmodified foams based on polyurethanes are known, for example, from WO 2005/103107 or WO 2006/008054.

Production methods for unmodified foams based on melamine-formaldehyde resins are disclosed, for example, in EP-A 17 672, EP-A 37 470, and WO 01/94436. According to these, a mixture of a melamine-formaldehyde precondensate dispersed or dissolved in an aqueous medium, a propellant, a dispersant, and a hardener is heated, foamed and cured. The heating can be carried out, for example, with the help of heated air, steam or microwave irradiation. The concentration of the melamine/formaldehyde precondensate in the mixture is generally 55 and 85% by weight, preferably between 63 and 80% by weight.

The bulk density of the open-cell foam based on melamine-formaldehyde resins used as starting material is generally in the range from 3 to 100 kg/m$^3$, preferably in the range from 5 to 20 kg/m$^3$. The term "bulk density" refers, in a manner known in principle, to the density of the foam including the pore volume. The cell count is usually in the range from 50 to 300 cells/25 mm. The average pore size is usually in the range from 100 to 250 μm. The tensile strength is preferably in the range from 100 to 150 kPa and the elongation at break in the range from 8 to 20%.

To treat the unmodified, open-cell foam, a formulation is used which comprises at least water or aqueous solvent mixture, and a hydrophobin.

Suitable aqueous solvent mixtures comprise water and one or more water-miscible solvents. The choice of such components is only restricted in as much as the hydrophobins and the other components have to be soluble in the mixture to an adequate degree. Generally, such mixtures comprise at least 50% by weight, preferably at least 65% by weight and particularly preferably at least 80% by weight of water. Very particularly preferably, only water is used. The person skilled in the art makes a suitable selection from the water-miscible solvents depending on the desired properties of the formulation. Examples of suitable, water-miscible solvents comprise monoalcohols, such as methanol, ethanol or propanol, higher alcohols, such as ethylene glycol or polyether polyols, and ether alcohols, such as butyl glycol or methoxypropanol.

Preferably, the formulation used for the treatment has a pH$\geq$4, preferably $\geq$6 and particularly preferably $\geq$7. In particular, the pH is in the range from 4 to 11, preferably 6 to 10, particularly preferably 7 to 9.5 and very particularly preferably 7.5 to 9. For example, the pH can be 7.5 to 8.5 or 8.5 to 9.

To establish the pH, the formulation preferably comprises a suitable buffer. The person skilled in the art chooses a suitable buffer depending on the pH range intended for the coating. Mention is to be made, for example, of potassium dihydrogenphosphate buffer, tris(hydroxymethyl)aminomethane buffer (tris-buffer), borax buffer, sodium hydrogencarbonate buffer or sodium hydrogenphosphate buffer. Preference is given to tris-buffer.

The concentration of the buffer in the solution is determined by the person skilled in the art according to the desired properties of the formulation. The person skilled in the art will generally ensure an adequate buffer capacity in order to achieve the most constant coating conditions possible. A concentration of from 0.001 mol/l to 1 mol/l, preferably 0.005 mol/l to 0.1 mol/l and particularly preferably 0.01 mol/l to 0.05 mol/l, has proven useful.

Furthermore, the formulation comprises at least one hydrophobin. It is of course also possible to use mixtures of different hydrophobins. In a preferred embodiment of the invention, the abovementioned fusion hydrophobins can be used as hydrophobins. For example, yaad-Xa-dewA-his (SEQ ID NO: 20) can be used, and in particular products with a shortened yaad radical, such as, for example, yaad40-Xa-dewA-his. Advantageously, the products produced by the above-described simplified purification method can be used.

The concentration of the hydrophobins in the solution is chosen by the person skilled in the art depending on the desired properties of the coating. At higher concentrations, a more rapid coating can generally be achieved. A concentration of from 0.1 µg/ml to 1000 µg/ml, preferably 1 µg/ml to 500 µg/ml, particularly preferably 10 µg/ml to 250 µg/ml, very particularly preferably 30 µg/ml to 200 µg/ml and, for example, 50 to 100 µg/ml, has generally proven useful.

The formulation used can, moreover, optionally comprise further components and/or additives.

Examples of additional components comprise surfactants. Suitable surfactants are, for example, nonionic surfactants which comprise polyalkoxy groups, in particular polyethylene oxide groups. Examples comprise polyoxyethylene stearates, alkoxylated phenols and the like. Further examples of suitable surfactants comprise polyethylene glycol(20) sorbitan monolaurate (Tween® 20), polyethylene glycol(20) sorbitan mono-palmitate (Tween® 40), polyethylene glycol(20) sorbitan monostearate (Tween® 60), polyethylene glycol(20) sorbitan monooleate (Tween® 80), cyclohexylmethyl-β D-maltoside, cyclohexylethyl-β D-maltoside, cyclohexyl-n-hexyl-β D-maltoside, n-undecyl-β D-maltoside, n-octyl-β D-maltopyranoside, n-octyl-β D-glucopyranoside, n-octyl-α D-glucopyranoside, n-dodecanoylsucrose. Further surfactants are disclosed, for example, in WO 2005/68087 page 9, line 10 to page 10, line 2. The concentration of surfactants is generally 0.001% by weight to 0.5% by weight, preferably 0.01% by weight to 0.25% by weight and particularly preferably 0.1% by weight to 0.2% by weight, in each case based on the amount of all components in the formulation.

Furthermore, metal ions, in particular divalent metal ions, can also be added to the formulation. Metal ions can contribute to a more even coating. Examples of suitable divalent metal ions comprise, for example, alkaline earth metal ions such as $Ca^{2+}$ ions. Such metal ions can preferably be added as salts soluble in the formulation, for example in the form of chlorides, nitrates or carbonate, acetate, citrate, gluconate, hydroxide, lactate, sulfate, succinate, tartrate. For example, $CaCl_2$ or $MgCl_2$ can be added. The solubility can optionally also be increased through suitable auxiliaries, for example complexing agents. If present, the concentration of such metal ions is usually 0.01 mmol/l to 10 mmol/l, preferably 0.1 mmol/l to 5 mmol/l and particularly preferably 0.5 mmol/l to 2 mmol/l.

The formulations can be obtained by mixing the above-described solutions from the work-up with the desired additional components, and diluting to the desired concentration. The formulations can of course also be obtained by correspondingly dissolving isolated, solid hydrophobins.

According to the invention, the unmodified, open-cell foam is treated with the formulation comprising hydrophobins. In order to ensure even modification of the entire internal surface of the foam, the foam should be impregnated as completely as possible with the formulation. The treatment can be undertaken, in particular, by dipping the foam into the formulation, spraying it with the formulation or pouring the formulation on it.

As a rule, a certain contact time is required in order to deposit the fusion hydrophobins on the surface. The person skilled in the art chooses a suitable contact time depending on the desired result. Examples of typical contact times are 0.1 to 12 h, without the invention being restricted thereto.

As a rule, the contact time is dependent on the temperature and on the concentration of the hydrophobin in the solution. The higher the temperature and the higher the concentration in the course of the coating operation, the shorter the contact time can be. The temperature in the course of the coating operation can be room temperature, or else the temperatures may be elevated. For example, it may be temperatures of 5, 10, 20, 30, 40, 50, 60, 70, 80, 90, 100, 110 or 120° C. It is preferably temperatures from 15 to 120° C., particularly preferably 20 to 100°C., and for example 40 to 100° C. or 70 to 90° C. The temperature can be introduced, for example, by heating the bath in which the object to be coated is immersed. However, it is also possible to heat an immersed object afterwards, for example with the help of IR emitters.

In a preferred embodiment of the invention, the treatment takes place with hydrophobins in the presence of microwave irradiation. As a result, the contact time can be very considerably reduced. Depending on the input of energy, just a few seconds are sometimes adequate for depositing the hydrophobin on the surface.

After the coating, the solvent is removed from the foam. Preferably, the foam can firstly be squeezed in order to remove the majority of the solvent. Optionally, the foam can be washed beforehand with water or a preferably aqueous solvent mixture. The removal of the solvent can take place, for example, by simple evaporation in air. The removal of the solvent can, however, also be facilitated by increasing the temperature and/or with suitable gas streams and/or applying a vacuum. Evaporation can be aided by, for example, heating coated objects in a drying cabinet or blowing them with a heated gas stream. The methods can also be combined, for example by drying in a convection drying cabinet or a drying tunnel. Furthermore, the coating can be heated to remove the solvent also by means of radiation, in particular IR radiation. For this, all types of broadband IR emitters, for example NIR, MIR or NIR emitters can be used. However, it is also possible, for example, to use IR lasers. Such radiation sources are commercially available in a variety of radiation geometries.

The temperature and the drying time in the course of drying is set by the person skilled in the art. A drying temperature of from 30 to 130° C., preferably 50 to 120° C., particularly preferably 70 to 110° C., very particularly preferably 75 to 105° C. and, for example, 85 to 100° C., has proven useful. Here, the temperature of the coating itself is intended. The temperature in a dryer can of course also be higher. The drying time is naturally shorter, the higher the drying temperature.

The temperature treatment in the course of coating and the drying can be advantageously combined. Thus, for example, a surface can firstly be treated with the formulation at room temperature and then be dried and heat-treated at elevated temperatures. In a preferred embodiment of the method, increased temperature is applied at least in one of the two steps "treatment" or "drying". A temperature higher than room temperature is preferably applied in both steps.

The treatment can be undertaken directly after the production process of the unmodified foam, for example by the manufacturer of the foam itself. However, it can also of course not be undertaken until a later time, for example by a further processor or after the foam has been delivered to the end consumer by him himself.

Treatment of the open-cell foam according to the described process produces an open-cell foam modified with hydrophobins. As a result of the modification, the open-cell foam is more hydrophobic than the unmodified foam.

Surprisingly, the bulk density of the modified foam is only insignificantly above that of the unmodified foam. The bulk density of the modified foam is generally in the range from 3 to 100 kg/m$^3$. In the case of foams based on melamine-formaldehyde resins, the bulk density is preferably 5 to 15 kg/m$^3$ and particularly preferably in the range from 8 to 10 kg/m$^3$.

The density of the modified foam of course depends on the density and the internal surface of the unmodified foam. As a rule, the density of the foam modified with hydrophobin, however, is not more than 10%, preferably not more than 5%, greater than the density of the unmodified foam.

In a second embodiment of the invention, the modified foams can be obtained by carrying out the production of the foam in the presence of at least one hydrophobin.

In the case of the production of open-cell foams based on melamine-formaldehyde condensation products, the hydrophobins, and optionally further of the abovementioned constituents can, for this purpose, be mixed with the abovementioned aqueous solution or dispersion of the melamine-formaldehyde precondensate, of a propellant, of a dispersant, and of a curing agent. The mixture can then be heated, foamed and cured in a manner known in principle.

The foams modified with hydrophobins can on the one hand be used as unmodified foams, for example for thermal and noise insulation of buildings and parts of buildings, for thermal and noise insulation of the engine spaces and internal spaces of vehicles and aeroplanes, and also for low-temperature insulation, for example of cold stores, oil tanks and containers of liquid gas. Further fields of use comprise the use as insulating wall cladding, and as insulating and shock-absorbing packaging material. The ability to absorb water, reduced by virtue of the modification with hydrophobins, reduces the impairment of the insulating effect of the foam due to atmospheric moisture. Furthermore, the mass of the insulation is prevented from increasing as a result of the absorption of water. This is of great importance particularly for use in vehicles and very particularly aeroplanes.

The modified open-cell foam according to the invention has a considerably greater affinity to nonpolar organic liquids. It therefore also offers new types of possible uses compared to the unmodified foams.

It can, for example, be used for absorbing organic liquids. Of suitability for this purpose are very particularly modified foams based on melamine-formaldehyde condensation products. The organic liquids may, for example, be fuels which have escaped after an accident which can be selectively absorbed by the modified foam. The modified foam can here, for example, be laid out in the form of a mat, or else also scattered as granules. Further uses comprise leakage and bleeding protection for liquid stores, such as, for example, fuel tanks, oil tanks, tanker containers for tanker vehicles, tanker trailers or tanker ships. The liquid stores can here be wrapped, for example, with the modified foam. In this case, in the case of a leak or in the case of overflowing, the foam firstly becomes soaked with the liquid.

In a preferred use, the modified foam can be used for liquid separation. Here, two-phase liquid mixtures are separated from one another by the foam selectively absorbing one of the two phases from the mixture. The modified foam according to the invention can be used in particular for the selective separation of organic phases of two-phase, aqueous-organic mixtures. Here, the organic phase is absorbed exclusively or at least preferably by the modified foam, depending on the polarity. In a preferred use of the foam, the organic phases may be oil phases. The removed liquid phase can be separated again from the foam following absorption by simple squeezing. The squeezed-out foam can then be reused.

In the case of separation, it may, for example, involve the separation of an oil carpet on a water surface. The modified foam preferably becomes soaked with the oil and floats on the water even in fully soaked state. An unmodified foam preferably becomes soaked with water and ultimately sinks.

Furthermore, it may involve separating off oil residues, in particular crude oil residues from aqueous phases. In the recovery of crude oil, a crude oil/water mixture or a crude oil/water emulsion is usually produced, which is separated firstly using suitable emulsifiers. After separating off the majority of the oil, an aqueous phase remains in which small amounts of oil, generally only 0.1 g/l, are still distributed, which can usually only be separated off with very great difficulty. Using the inventive foams modified with hydrophobins, such residues can be removed elegantly, for example by dipping the modified foam into the oil/water mixture. However, it is also conceivable to use the open-cell foam modified with hydrophobins as fill material for a suitable separation device, for example as fill material for a column.

The modified open-cell foams are also suitable for absorbing certain substances and/or particles in their hydrophobic pores and can therefore serve to separate off such substances and/or particles from the environment. For example, hydrophobic components, aerosols, dyes and/or odors or pollen can be separated off.

In a further preferred use, the modified foams based on melamine-formaldehyde condensation products can, in particular, be used as sterilizable work material, in particular for microbiology.

Culture tubes, bottles and flasks to be kept sterile are usually sealed with stoppers made of cotton wool, rolled pulp or silicone foam which, on the one hand, allow air to enter, but on the other hand, being deep-bed filters, also retain germs in the air. However, they must comprise no moisture whatsoever because otherwise microorganisms can grow through inwards from the outside. According to the invention, the modified foams can be used advantageously for this purpose. As a result of the increased hydrophobicity, moisture is effectively kept away from materials.

The work material may, for example, be stoppers with which culture tubes, bottles or flasks for medicinal or microbiological work are sealed. Such stoppers can be treated for sterilization at temperatures above 100° C. It may also be material for sealing vessels in which contaminated material is decontaminated by treatment at temperatures above 100° C.

Details for carrying out sterilizations are known to the person skilled in the art. Foams based on melamine-formaldehyde condensation products modified according to the invention have high thermal stability and can be treated even at temperatures around 180° C.

The examples below are intended to illustrate the invention in more detail:

Provision of the Hydrophobins

For the examples, a fusion hydrophobin with the complete fusion partner yaad was used (yaad-Xa-dewA-his; called hydrophobin A below), as was a fusion hydrophobin with a fusion partner shortened to 40 amino acids yaad40-Xa-dewA-his (hydrophobin B). The production was carried out in accordance with the procedure described in WO 2006/082253.

The products were worked up in accordance with the simplified purification method according to example 9 of WO 2006/82253 and spray-dried according to example 10 of the same specification. The total protein content of the resulting dried products was in each case about 70 to 95% by weight, the content of hydrophobins was about 40 to 90% by weight with regard to the total protein content. The products were used as such for the experiments.

Application-related test: characterization of the fusion hydrophobins through contact angle change of a water drop on glass Substrate:

Glass (window glass, Süddeutsche glass, Mannheim)

For the tests, the spray-dried products comprising fusion hydrophobins were dissolved in water with the addition of 50 mM Na acetate pH 4 and 0.1% by weight of polyoxyethylene (20) sorbitan monolaurate (Tween® 20). Concentration of the product: 100 µg/ml in aqueous solution.

Procedure:

incubation of small glass plates overnight (temperature 80° C.), then washing of coating in distilled water, then incubation 10 min/80° C./1% sodium dodecyl sulfate (SDS) solution in dist. water, washing in dist. water The samples are dried in the air and the contact angle (in degrees) of a drop of 5 µl of water is determined at room temperature.

The contact angle measurement was determined on a dataphysics contact angle system OCA 15+, software SCA 20.2.0 (November 2002). The measurement was made in accordance with the manufacturers instructions.

Untreated glass gave a contact angle of from 15° to 30°±5°. A coating with the fusion hydrophobin yaad-Xa-dewA-his$_6$ gave a contact angle enlargement of more than 30°; a coating with the fusion hydrophobin yaad40-Xa-dewA-his likewise gave a contact angle enlargement of more than 30°.

Production and Characterization of Modified Open-Cell Foams

EXAMPLES 1 AND 2

Subsequent Modification

In each case cube-shaped samples (7 cm×7 cm×7 cm) of an open-cell melamine-formaldehyde foam with a density of 9 kg/m$^3$ (Basotect®, BASF AG) were placed in a glass flask and saturated with a solution of 0.1 g/l of hydrophobin A or hydrophobin B. The solution with the saturated foam cube was heated for 15 h at 60° C. The aqueous solution was then decanted off. The foam cubes were freed from the majority of the absorbed liquid by squeezing, washed several times with high-purity water and squeezed and dried at 40° C. to constant weight. The density of the modified foam samples is given in table 1.

To determine the water absorption, cube-shaped samples measuring 3 cm×3 cm×3 cm were cut and placed in water at room temperature for 30 min. The weight increase was determined gravimetrically and converted to % by volume. The data are likewise given in table 1.

Comparative Experiment 1

The water absorption of the unmodified foam according to example 1 was determined as described above. The data are given in table 1.

Comparative Experiment 2

An unmodified foam according to example 1 was impregnated for the hydrophobicization with rapeseed oil expressed completely and dried. The weight increase and the water absorption were in each case determined as described above. The data are given in table 1.

Comparative Experiment 3

Data from example 1 of EP-A 633 283; an open-cell melamine-formaldehyde foam with a density of 11 kg/m$^3$ (Basotect®, BASE AG) was impregnated with silicone oil according to the described procedure.

TABLE 1

Results of the examples and comparative examples
(*calculated for the upper limit of 9.2)

| Foam, modified with | Density [kg/m$^3$] | Density increase [%] | Ability to float | Water absorption [% by vol.] |
|---|---|---|---|---|
| Example 1 Hydrophobin A | 9-9.2 | 2.2* | floats | 0.2-0.5 |
| Example 2 Hydrophobin B | 9-9.2 | 2.2* | floats | 0.3-0.4 |
| C1 Unmodified | 9 | — | sinks | 95-100 |
| C2 Rapeseed oil | >>20 | >120 | sinks | 50-100 |
| C3 Silicone oil | 78 | ca. 600 | — | 25 |

The examples and comparative examples show that the unmodified, open-cell foam can be hydrophobicized in an excellent manner when using hydrophobins and, despite this, only a minimal increase in the density is observed.

EXAMPLE 3

Modification by Addition of Hydrophobins in the Course of Foam Production

The production was carried out according to the method described in WO 01/94436. Just prior to the foaming of the propellant-containing melamine-formaldehyde precondensate, additionally 0.5% by weight of hydrophobin A based on the solids fraction was added in the form of an aqueous solution. The resulting foams were firstly dried at 100° C. and then heat-treated at 220° C.

The foam produced in this way does not sink in when placed on a water surface whereas a foam produced from the same method but without the addition of hydrophobin does sink in.

Variation in the Coating Conditions

In a glass flask, in each case cuboid samples (1.5 cm×0.5 cm×0.3 cm≡0.225 cm$^3$) of an open-cell melamine-formaldehyde foam with a density of 9 kg/m$^3$ (Basotect®, BASF AG) were poured over or saturated with in each case 2 cm$^3$ of the solution used for the treatment and treated for a certain time and temperature. After the treatment, the samples were squeezed, washed and dried at 40° C. to constant weight.

The degree of hydrophobicization of the modified foam was determined in each case by dripping a water drop of 5 µl onto the surface of the dried, modified foam at room temperature. It was observed whether it was soaked up by the foam or not.

Experimental Series 1

In a first experimental series, a coating formulation of hydrophobin A in water with a buffer and addition of CaCl$_2$ was used (50 mmol/l tris/HCl buffer, 1 mmol/l CaCl$_2$; pH of the buffered solution: pH 8). The concentration of the hydrophobin, the temperature and the time were varied. For the control, solutions without the addition of hydrophobin were used in each case. The results are summarized in table 2.

TABLE 2

Results of experimental series 1

| | Time | | | | | | | | |
|---|---|---|---|---|---|---|---|---|---|
| | 5 min | | | 1 h | | | 4 h | | |
| | Concentration of hydrophobin [mg/l] | | | | | | | | |
| | 1 | 10 | 100 | 1 | 10 | 100 | 1 | 10 | 100 |
| 20° C. | − | 0 | + | − | 0 | + | − | + | + |
| 60° C. | − | + | + | − | + | + | 0 | + | + |
| 80° C. | 0 | + | + | 0 | + | + | + | + | + |

(solution: 50 mmol/l tris-HCl buffer, 1 mmol/l CaCl$_2$; pH 8)
+ drop does not sink in ==> hydrophobicized
− drop sinks in ==> not hydrophobicized
0 drop partially/very slowly sinks in ==> partially hydrophobicized
Result for all samples without added hydrophobin: −

Experimental Series 2

In a second experimental series, a coating formulation of hydrophobin A in water with a buffer and addition of CaCl$_2$ was used (50 mmol/l Na acetate buffer, 1 mmol/l CaCl$_2$; pH of the buffered solution: pH 5). The concentration of the hydrophobin, the temperature and the time were varied. For the control, solutions without the addition of hydrophobin were used in each case. The results are summarized in table 3.

TABLE 3

Results of experimental series 2

| | Time | | | | | | | | |
|---|---|---|---|---|---|---|---|---|---|
| | 5 min | | | 1 h | | | 4 h | | |
| | Concentration of hydrophobin [mg/l] | | | | | | | | |
| | 1 | 10 | 100 | 1 | 10 | 100 | 1 | 10 | 100 |
| 20° C. | − | − | − | − | − | 0 | − | 0 | 0 |
| 60° C. | − | 0 | + | − | + | + | + | + | + |
| 80° C. | − | + | + | − | + | + | + | + | + |

(solution: 50 mmol/l Na acetate buffer, 1 mmol/l CaCl$_2$; pH 5)
+ drop does not sink in ==> hydrophobicized
− drop sinks in ==> not hydrophobicized
1 drop partially/very slowly sinks in ==> partially hydrophobicized
Result for all samples without added hydrophobin: −

The results show that even with a concentration of only 1 mg/l of hydrophobin, adequate hydrophobicization can be achieved provided the coating conditions are chosen accordingly. Coating can be carried out both at pH 8 and also at pH 5, with pH 8 being recommended if coating is to be carried out at low concentrations and under mild conditions.

Experimental Series 3

In a third experimental series, the influence of microwave radiation on the coating result was investigated. The microwave source used was a standard commercial domestic microwave appliance with a maximum power of 1000 W, adjustable in 9 power levels 1 to 9.

For the treatment, a solution (50 mmol/l tris-HCl buffer, 1 mmol/l CaCl$_2$; pH 8) which comprised 100 mg/l of hydrophobin A was used. The untreated foam was firstly immersed as described above at room temperature into the solution and saturated and then heated in the microwave in each case until the treatment solution was boiling. The treated foam was then squeezed as described above, washed, dried and tested as above with regard to the degree of hydrophobicization. Table 4 indicates the time required in each case until the treatment solution was boiling, and also the result of the test for hydrophobicity.

TABLE 4

Results of experimental series 3

| | Level | | | | | | | | |
|---|---|---|---|---|---|---|---|---|---|
| | 1 | 2 | 3 | 4 | 5 | 6 | 7 | 8 | 9 |
| Time [mm:ss] | >05:00 | 03:14 | 01:59 | 00:55 | 00:45 | 00:30 | 00:28 | 00:34 | 00:19 |
| Result | + | + | + | + | + | + | + | + | + |

All control samples: −

The result shows that after microwave irradiation for just about 20 s at 1000 W, complete hydrophobicization of the foam has occurred.

Experimental Series 4:

Investigation of the Temperature Resistance of the Coating

The unmodified foams were firstly coated with hydrophobin as described above. For the treatment, a solution (50 mmol/l tris-HCl buffer, 1 mmol/l $CaCl_2$; pH 8) which comprised 1000 mg/l of hydrophobin A was used. It was coated using the described microwave appliance (1 min; 200 W).

The dried modified foams were then stored in a drying cabinet at the temperatures and for the times detailed in table 5 and then tested for hydrophobicity. In each case, control samples were treated in the same way but without hydrophobin in the treatment solution. The results are detailed in table 5.

TABLE 5

Result of the storage experiments at elevated temperatures

| | Time | | | | | | |
|---|---|---|---|---|---|---|---|
| Temp. | 5 min | 20 min | 1 h | 2 h | 4 h | 8 h | 24 h |
| 100° C. | + | + | + | + | + | + | + |
| 120° C. | + | + | n.d. | n.d. | n.d. | n.d. | n.d. |
| 140° C. | + | + | n.d. | n.d. | n.d. | n.d. | n.d. |
| 160° C. | + | + | n.d. | n.d. | n.d. | n.d. | n.d. |
| 180° C. | + | + | n.d. | n.d. | n.d. | n.d. | n.d. |
| 200° C. | + | + | n.d. | n.d. | n.d. | n.d. | n.d. |

All control samples: -;
n.d.: not determined

The results show that the hydrophobicization at 100° C. is retained even during persistent thermal stress, even at 200° C., at least short-term stress is uncritical.

Use of Modified Foams

Separation of Hexane/Water Mixtures or Benzine/Water Mixtures

For the separation experiments, the modified melamine-formaldehyde foam produced according to example 2 was used (i.e. the foam modified with hydrophobin B).

Cubes of the modified foam (3.4 $cm^3$) were in each case poured over with a two-phase mixture of water (colored with a water-soluble dye) and a thus immiscible organic solvent. In one of the experiments, n-hexane was used, in the others premium benzine. For comparison purposes, in each case unmodified foams were also treated in the same way. In each case, it was waited until the foam was completely soaked with liquid. The untreated foam in each case sank in the aqueous phase, whereas the treated foam floated at the interface between organic and aqueous phase. Following absorption, the foam was removed from the liquid, the absorbed liquid was squeezed out and in each case analyzed for its fraction of organic phase and water. The results are summarized in table 6.

TABLE 6

Results of the separation experiments;
amount of liquid comprised in the foam

| Org. solvent | Foam | Water [ml] | Org. solvent [ml] |
|---|---|---|---|
| Benzine | untreated | 3.2 | 0 |
| | treated | 0.1 | 3.0 |
| n-Hexane | untreated | 3.3 | 0 |
| | treated | 0.1 | 3.2 |

The results show that the foam has completely "changed poles" as a result of the modification with hydrophobin. While the untreated foam absorbs exclusively water, the treated foam absorbs predominantly organic solvent.

Retention Capacity for Organic Solvents

For the following experiments, the modified melamine-formaldehyde foam produced according to example 2 was likewise used (i.e. the foam modified with hydrophobin B).

Cube-shaped samples of the modified and unmodified foam were in each case attached to a rod and saturated with various organic solvents (hexane, xylene, benzine). In order to improve visibility, the solvents were colored with a red dye which is readily soluble in the organic solvent, but insoluble in water. All of the foam samples absorb the solvents rapidly and completely. The saturated samples were then placed into a vessel filled with water and gently mechanically stressed using the rod by a stirring movement in the water.

In the case of the unmodified foam, the solvent was immediately virtually completely suppressed by water while the foam modified with hydrophobins retains the organic solvent virtually completely in the inside of the foam.

Separation of Crude Oil/Water Mixtures

Production of a Crude Oil/Water Emulsion

For the separation experiments, an emulsion of crude oil (Wintershall, Emlichheim well 301/83 from Feb. 4, 2005) in completely demineralized water was produced. The emulsion was carried out by intensive mixing of water and oil using an ultra-turrax (4 min at 24 000 rpm). Excess oil lenses were removed by means of separating funnels. The oil concentration was 1000 ppm Separation Experiments The emulsion was divided between 3 vessels in equal amounts and in each case a section of a foam based on melamine-formaldehyde resin was dipped in, in each case a foam treated with hydrophobin A and with hydrophobin B (according to examples 1 and 2) and, for comparison purposes, an untreated sample. The samples were each left for 24 h in the emulsion.

In the case of the two modified foams, a visible amount of oil was sucked out of the emulsion in each case. The untreated foam became saturated with water, no adsorption of oil could be established. Cross sections of sample bodies are shown in FIGS. 1 and 2.

FIG. 1: Modified foam

FIG. 2: Unmodified foam for comparison

Removal of an Oil Carpet

A vessel was filled with completely demineralized water and in each case a thin layer of crude oil (Wintershall, Landau from Feb. 4, 2005; thin-liquid at 20° C., <10% water) was poured on.

In each case, a section of a foam produced according to examples 1 and 2, and, for comparison purposes, an untreated sample were placed onto the oil spill.

FIGS. 3 to 5 show the course of the experiment.

FIG. 3: Start of the experiment

FIG. 4: During the experiment

FIG. 5: Foam after the end of the experiment

The modified foams absorbed virtually the entire oil carpet within 5 min. In the case of the foam treated with hydrophobin B, the oil was more completely separated off than in the case of hydrophobin A. The unmodified foam became essentially saturated with water. The oil adhesion was only superficial. Relatively large amounts of oil remained on the surface of the water.

The invention claimed is:

1. An open-cell foam selected from the group of foams based on a melamine-formaldehyde condensation product, a polyurethane or a polyimide, wherein the foam has been modified with at least one hydrophobin.

2. The open-cell foam according to claim 1, wherein the foam has a density of from 3 to 100 kg/m$^3$.

3. The open-cell foam according to claim 1, wherein the foam is a foam based on a melamine-formaldehyde condensation product.

4. The open-cell foam according to claim 3, wherein the melamine/formaldehyde molar ratio is 1:1 to 1:5.

5. The open-cell foam according to claim 3, wherein the amount of hydrophobin is 5 to 10 g/m$^3$ of foam.

6. A method of producing the modified, open-cell foam according to claim 1, which comprises treating an unmodified, open-cell foam with an aqueous solution of a hydrophobin.

7. The method according to claim 6, wherein the treatment is undertaken at a temperature of from 20 to 120° C.

8. The method according to claim 6, wherein treatment takes place with heating, and the heating is undertaken by means of microwave irradiation.

9. The method according to claim 6, wherein the concentration of the at least one hydrophobin in the aqueous solution is 0.1 µg/ml to 1000 µg/ml.

10. A method of producing the modified, open-cell foam according to claim 1, which comprises producing the open-cell foam in the presence of at least one hydrophobin.

11. The method according to claim 10, wherein it is a method of producing a modified, open-cell foam based on a melamine-formaldehyde condensation product, in which a mixture comprising at least one melamine-formaldehyde (MF) precondensate, a dispersant, a curing agent, and a propellant is foamed with heating and cured, and the production is undertaken in the presence of at least one hydrophobin.

12. The method according to claim 11, wherein the melamine/formaldehyde molar ratio of the precondensate is in the range from 1:1 to 1:5.

13. An insulating material which comprises the modified, open-cell foam according to claim 1.

14. Noise and/or thermal insulation in aeroplanes which comprises the modified, open-cell foam according to claim 1.

15. A process for absorbing organic liquids which comprises utilizing the modified, open-cell foam according to claim 1 in organic liquids.

16. A process for leakage and bleeding protection for liquid stores which comprises utilizing the modified, open-cell foam according to claim 1.

17. A process for liquid-liquid separation which comprises utilizing the modified, open-cell foam according to claim 1 in a liquid-liquid mixture.

18. A process for separation of oil from an oil-water mixture which comprises the utilizing the modified, open-cell foam according to claim 1 in the oil-water mixture.

19. A sterilizable work material which comprises the modified, open-cell foam according to claim 1.

20. The insulating material according to claim 13, wherein the foam is a modified, open-cell foam based on a melamine-formaldehyde condensation product.

* * * * *